United States Patent
Choi et al.

(10) Patent No.: US 8,243,707 B2
(45) Date of Patent: Aug. 14, 2012

(54) BEAM FORMING METHOD AND APPARATUS

(75) Inventors: In-Kyeong Choi, Daejeon (KR);
Dong-Seung Kwon, Daejeon (KR);
Choong-Il Yeh, Daejeon (KR); Ji-Won Kang, Incheon (KR); Chung-Yong Lee, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 575 days.

(21) Appl. No.: 12/517,753

(22) PCT Filed: Oct. 10, 2007

(86) PCT No.: PCT/KR2007/004958
§ 371 (c)(1),
(2), (4) Date: Jun. 4, 2009

(87) PCT Pub. No.: WO2008/069427
PCT Pub. Date: Jun. 12, 2008

(65) Prior Publication Data
US 2010/0322223 A1    Dec. 23, 2010

(30) Foreign Application Priority Data
Dec. 6, 2006   (KR) .................. 10-2006-0122857

(51) Int. Cl.
*H04B 7/216*   (2006.01)
(52) U.S. Cl. ............................................ 370/342
(58) Field of Classification Search .................. 370/342, 370/320, 335, 441
See application file for complete search history.

(56) References Cited

U.S. PATENT DOCUMENTS

| | | |
|---|---|---|
| 6,947,748 B2 | 9/2005 | Li et al. |
| 7,239,879 B2 | 7/2007 | Avidor et al. |

(Continued)

FOREIGN PATENT DOCUMENTS

KR  10-2003-0004608  1/2003

(Continued)

OTHER PUBLICATIONS

Pramod Viswanath et al., "Opportunistic Beamforming Using Dumb Antennas", IEEE Transactions on Information Theory, vol. 48, No. 6, Jun. 2002, 18 pages.

(Continued)

*Primary Examiner* — Derrick Ferris
*Assistant Examiner* — Mang Yeung
(74) *Attorney, Agent, or Firm* — Jefferson IP Law, LLP

(57) ABSTRACT

The present invention relates to a method of forming a random beam, and a beam forming apparatus. A quantization preprocessor and a random unitary matrix having a predetermined pattern are used to form a beam on a mobile terminal. A base station forms a beam using a codeword index of a quantization codebook received from a mobile terminal and channel quality information corresponding to the codeword index, and the mobile terminal generates the codeword index and the channel quality information using pilot signals generated by the base station. The number of pilot signals is equal to the number of transmitting antennas. Therefore, a codebook that has been known to both the mobile terminal and the base station is used, and the mobile terminal can select the codeword index for quantization, which makes it possible to selectively give diversity and thus improve the system efficiency.

16 Claims, 8 Drawing Sheets

U.S. PATENT DOCUMENTS

| | | | |
|---|---|---|---|
| 7,676,007 B1 * | 3/2010 | Choi et al. | 375/347 |
| 2004/0042558 A1 * | 3/2004 | Hwang et al. | 375/267 |
| 2005/0003768 A1 * | 1/2005 | Laroia et al. | 455/101 |
| 2006/0071807 A1 | 4/2006 | Sadowsky | |
| 2006/0222101 A1 | 10/2006 | Cetiner et al. | |
| 2007/0086542 A1 | 4/2007 | Lin | |
| 2008/0080634 A1 * | 4/2008 | Kotecha et al. | 375/267 |

FOREIGN PATENT DOCUMENTS

| | | |
|---|---|---|
| KR | 10-2004-0004462 | 1/2004 |
| KR | 10-2005-0050541 | 5/2005 |
| KR | 10-0659725 | 12/2006 |
| WO | 2005/114868 A1 | 12/2005 |
| WO | 2006/007299 A1 | 1/2006 |
| WO | 2007/066936 A2 | 6/2007 |

OTHER PUBLICATIONS

Il-Min Kim et al., "Opportunistic Beamforming Based on Multiple Weighting Vectors", IEEE Transactions on Wireless Communications, vol. 4, No. 6, Nov. 2005, 5 pages.

* cited by examiner

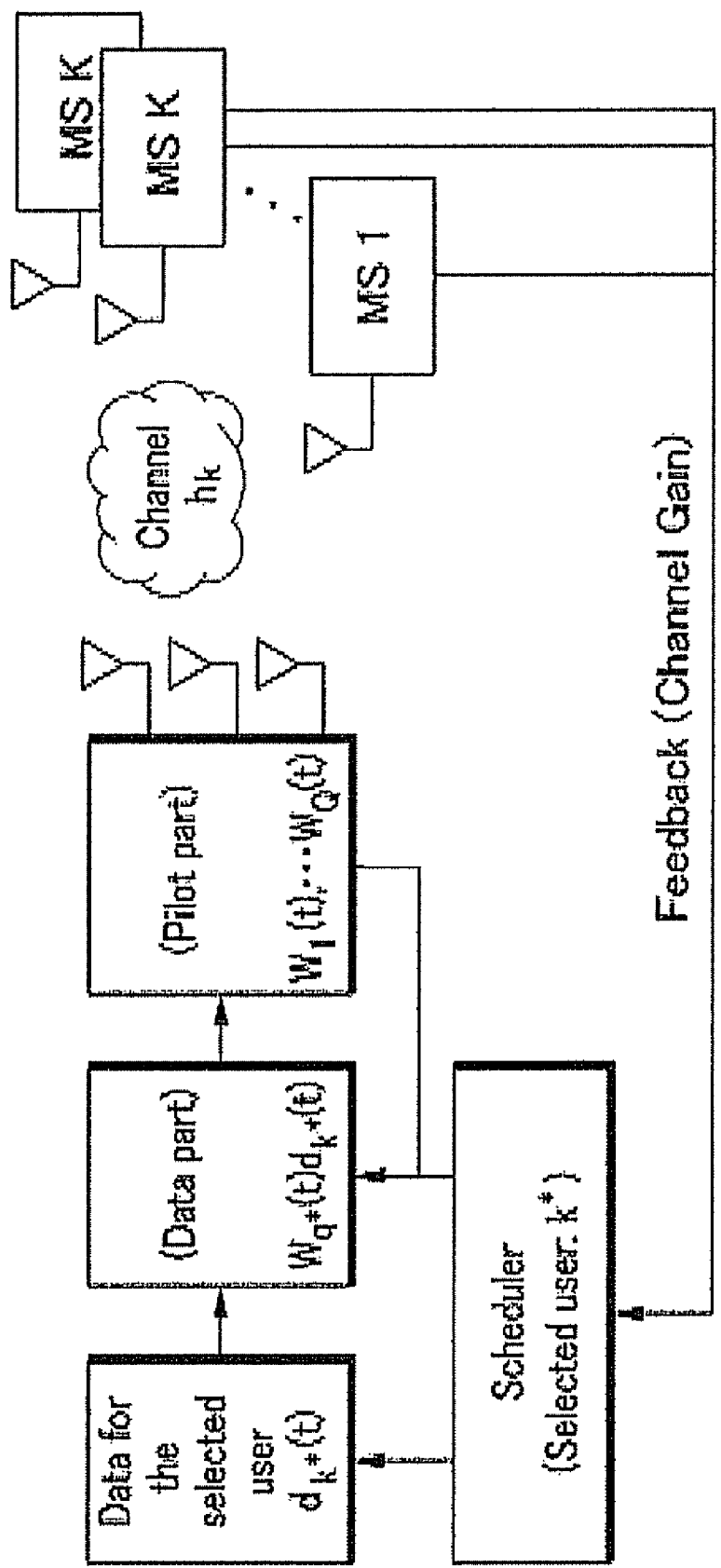
[Figure 1]

[Figure 2]
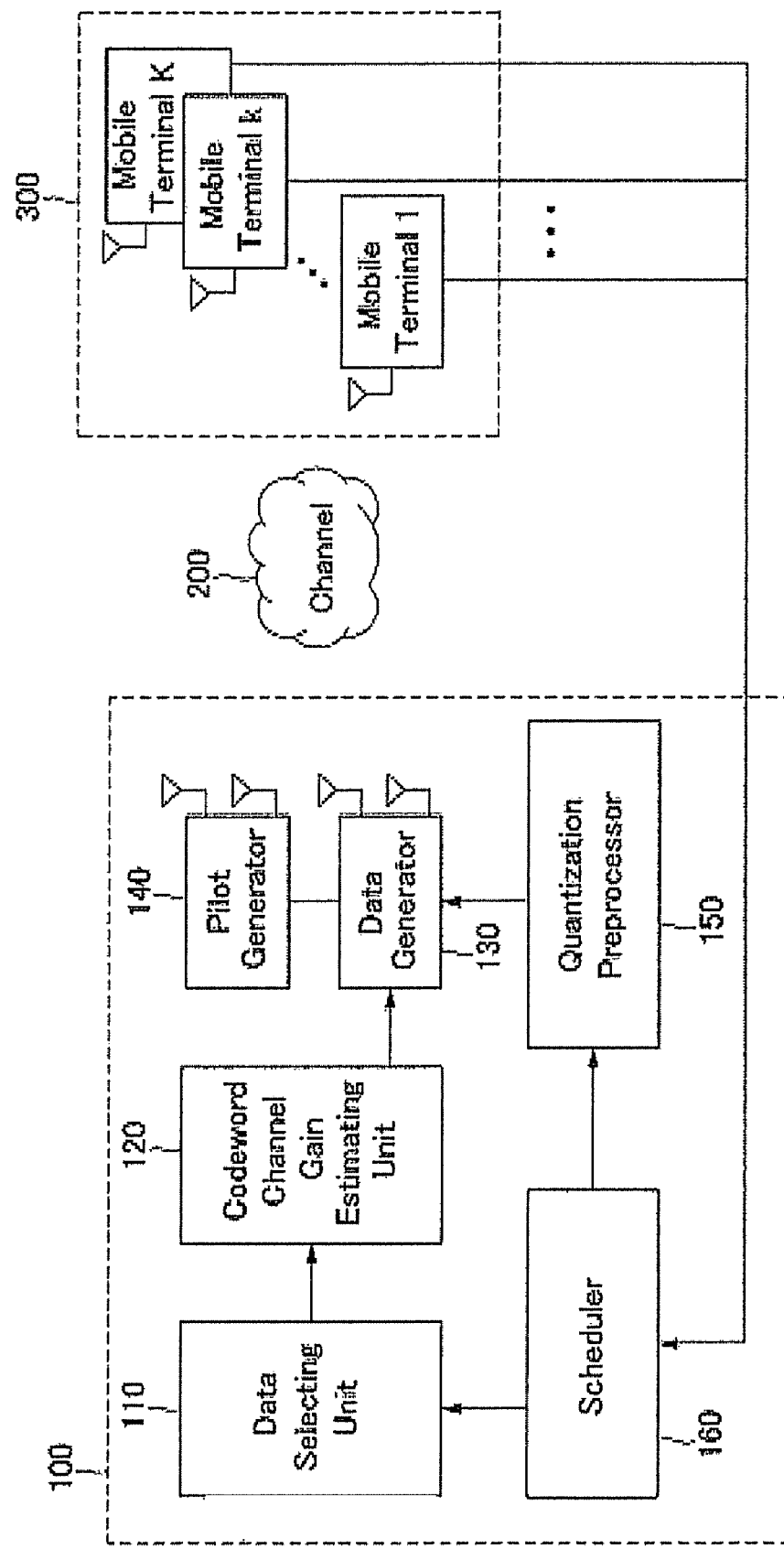

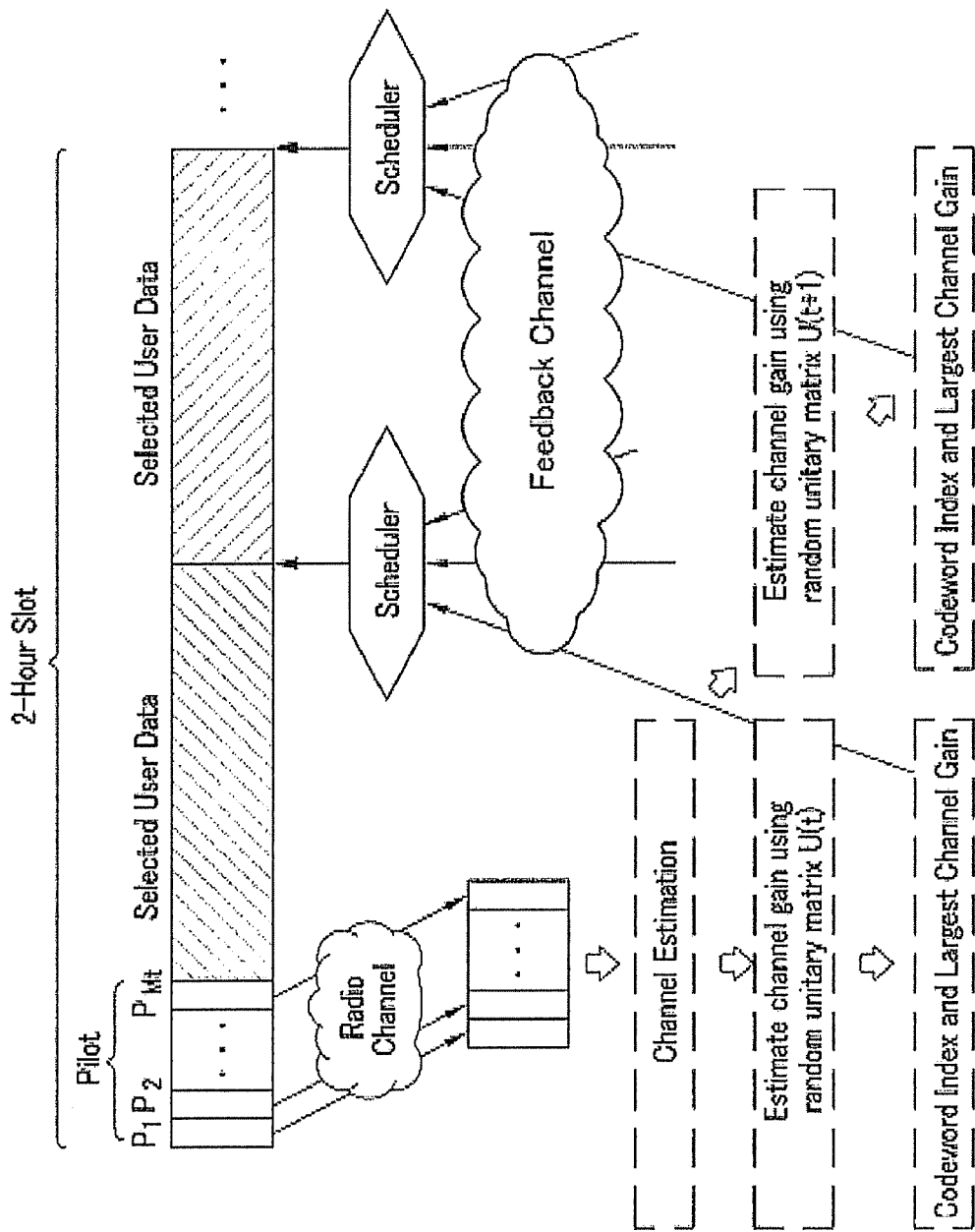
[Figure 3]

[Figure 4]
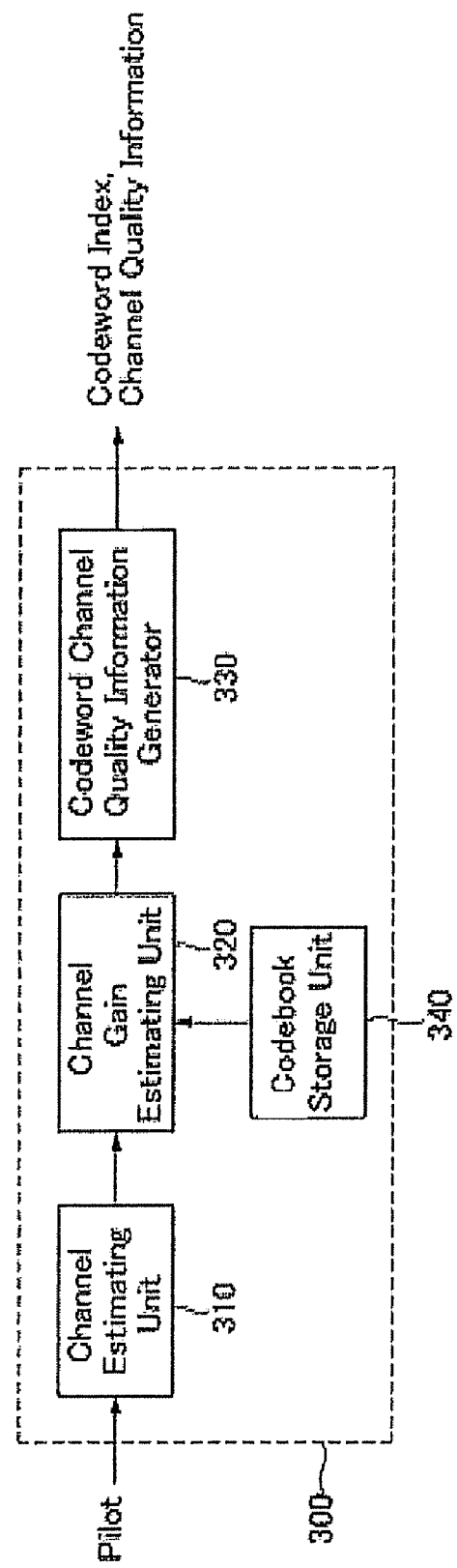

[Figure 5]
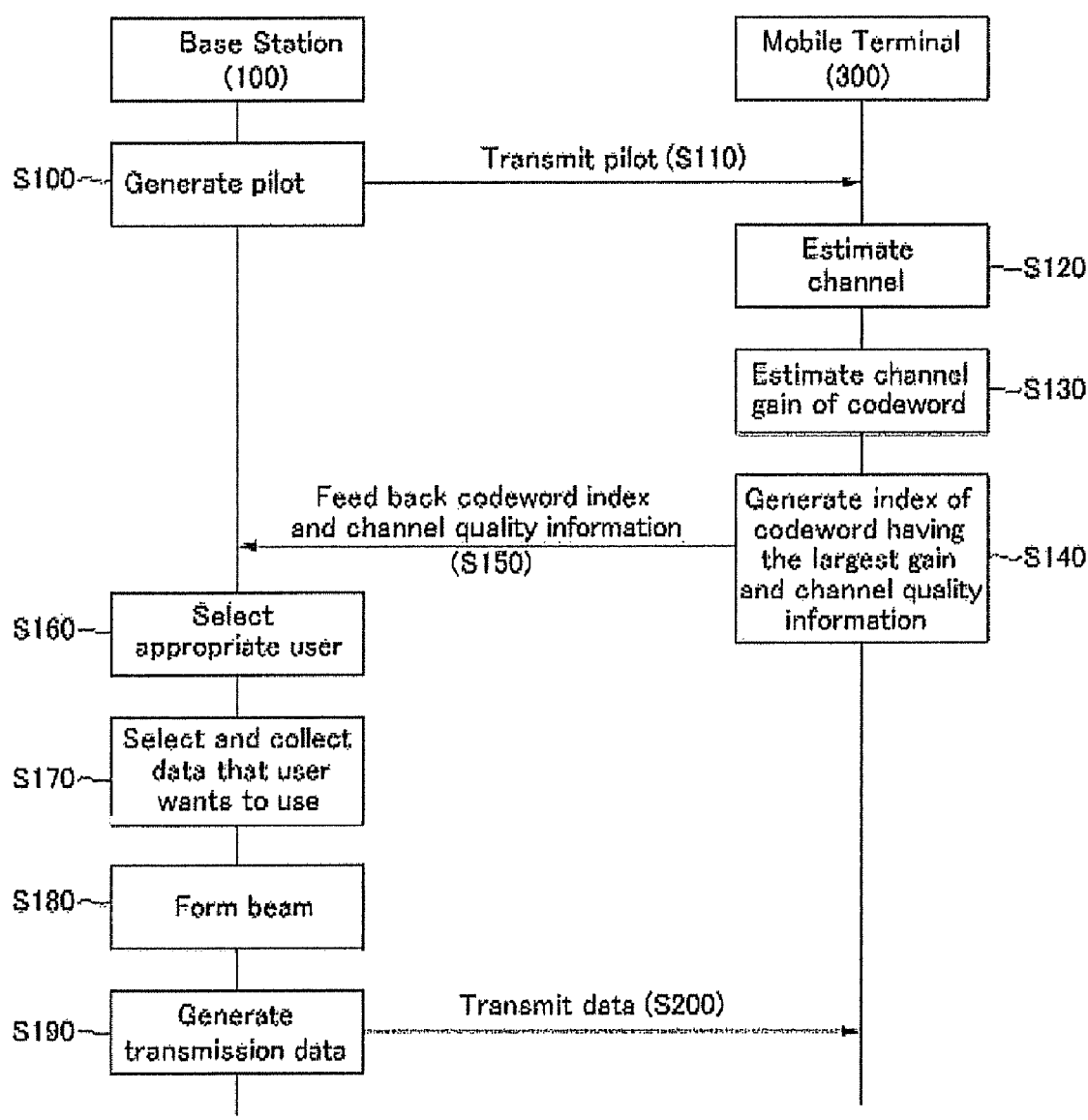

[Figure 6]
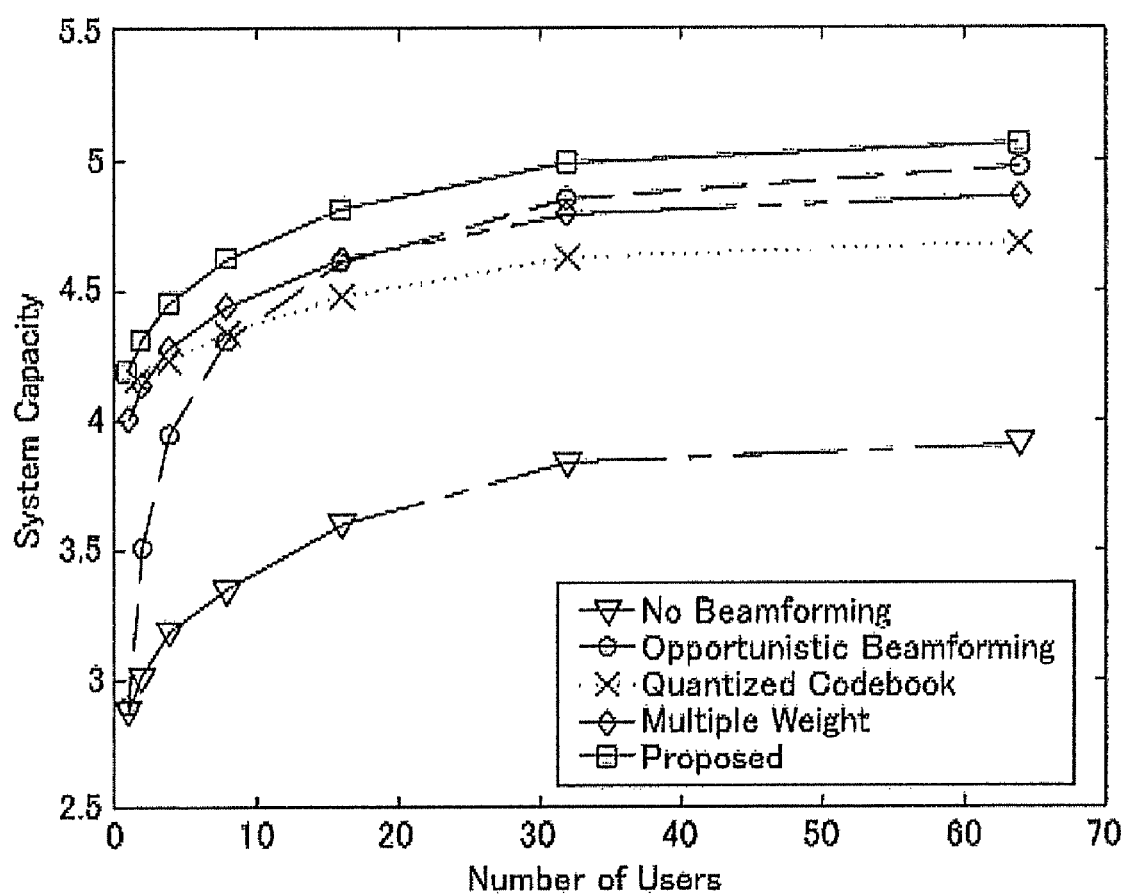

【Figure 7】
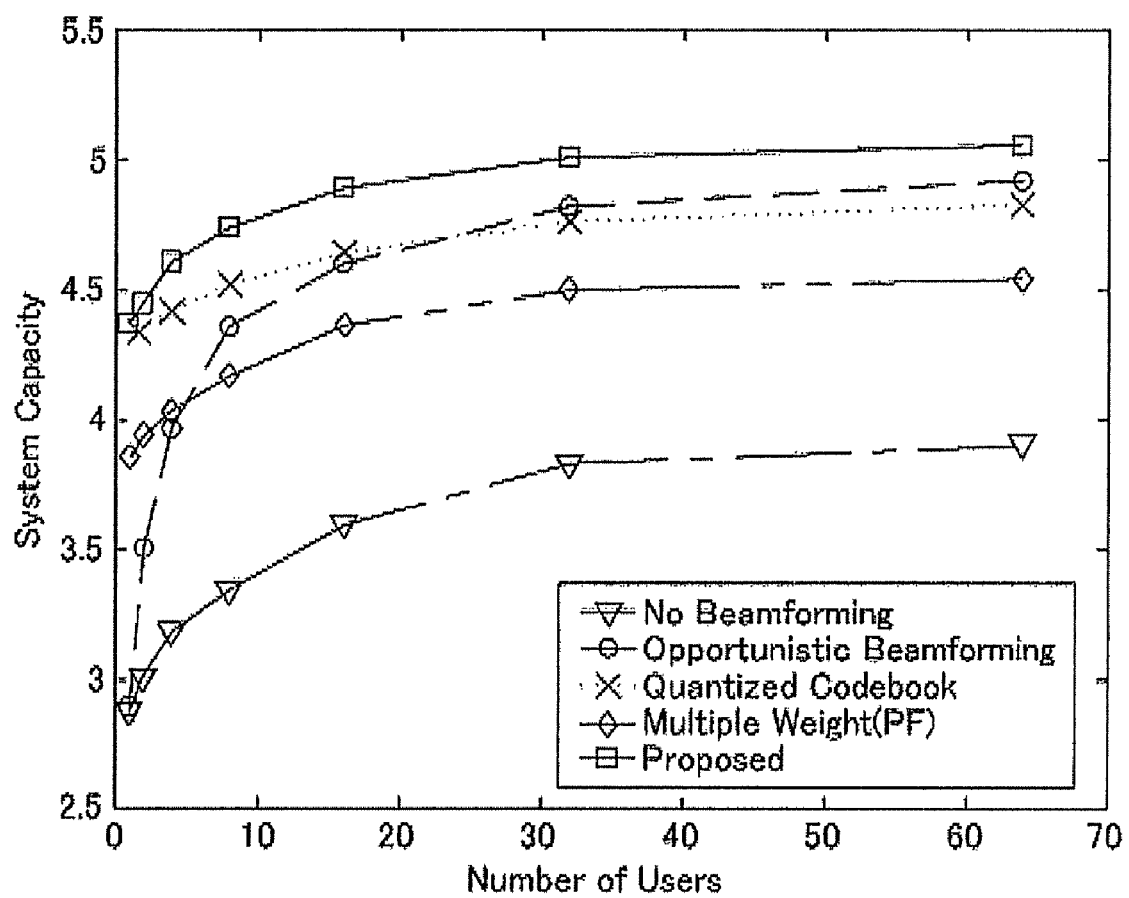

【Figure 8】
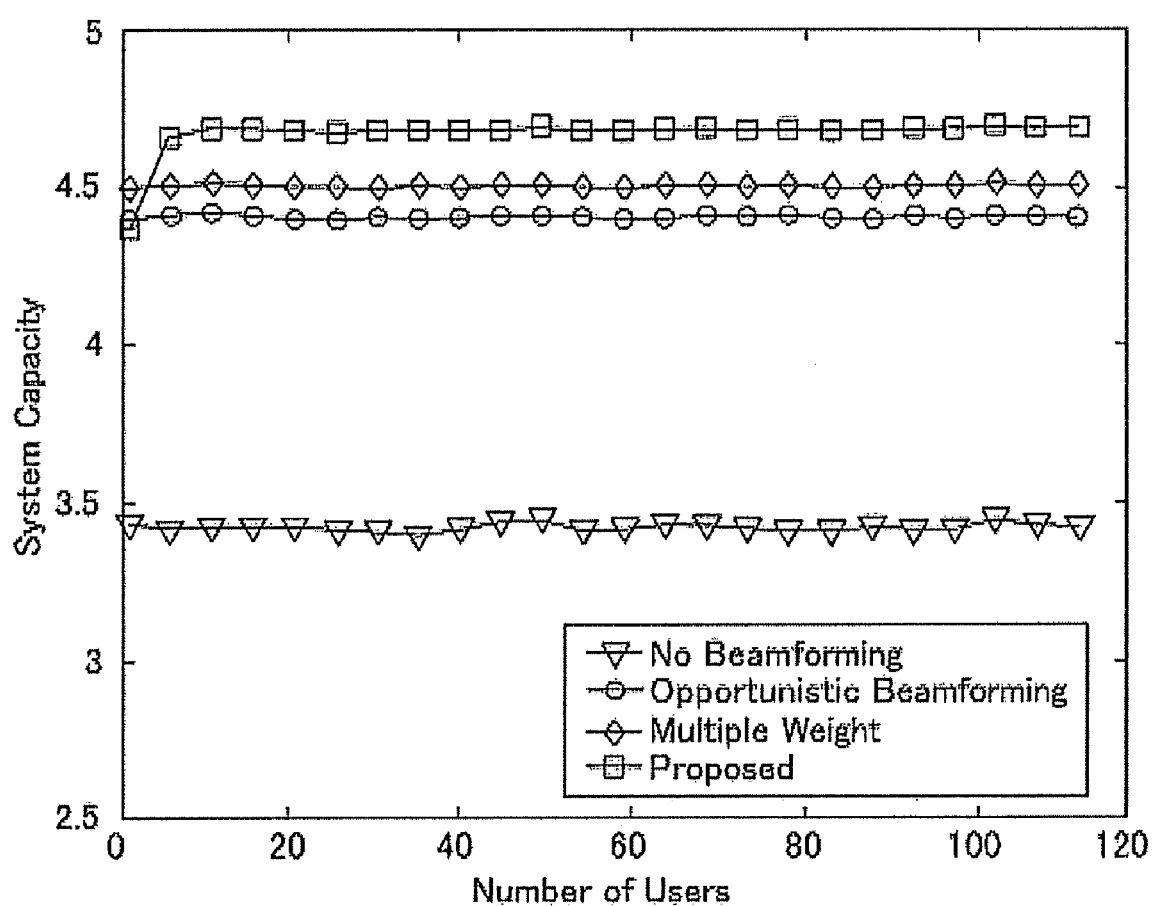

BEAM FORMING METHOD AND APPARATUS

CROSS REFERENCE TO RELATED APPLICATIONS

This application claims the benefit under 35 U.S.C. Section 371, of PCT International Application Number PCT/KR2007/004958, filed Oct. 10, 2007 and Korean Application No. 10-2006-0122857 filed Dec. 6, 2006 in Korea, the contents of both of which are incorporated herein by reference.

TECHNICAL FIELD

The present invention relates to a beam forming method and a beam forming apparatus, and more particularly to a method and apparatus for forming a random beam using a quantization preprocessor.

BACKGROUND ART

In a wireless communication system, multi-user diversity is used for an independent time-variable channel environment between users. A variation in the channels of a plurality of users is monitored, and when it is determined by scheduling that the channel of each user is in the best condition, that is, the largest channel gain is obtained, resources are allocated to the users, thereby obtaining a diversity gain.

The diversity gain increases as a variation in a channel increases. Therefore, in a channel environment in which a variation in a channel is small or a channel varies slowly, there are restrictions on the diversity gain. A method of obtaining a diversity gain by rapidly changing the channel using a multiple transmission antenna in such an environment is called an opportunistic beam forming (hereinafter referred to as OBF) scheme. However, the OBF scheme has a problem in that it can obtain a sufficient multi-user diversity gain only when there are many users.

In addition to the OBF scheme, a method of obtaining a diversity gain by using multiple pilots to improve diversity in the selection of the pilot has been proposed. However, the method has a problem in that system capacity is lowered due to a large number of pilots.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an apparatus for forming a beam using a quantization preprocessor and a unitary matrix.

In addition, the present invention provides a beam forming method that is capable of improving opportunistic beam forming (OBF) performance using a quantization codebook and a random unitary matrix.

Technical Solution

According to an embodiment of the present invention, there is provided a method of forming a beam on a mobile terminal in a base station. The method includes: receiving channel quality information and a codeword index for quantization from a plurality of mobile terminals that have received pilot signals for channel estimation, and selecting one mobile terminal on the basis of the channel quality information and the codeword index; collecting data to be transmitted to the selected mobile terminal, and selecting a beam formation code for the collected data; and generating transmission data on the basis of the collected data and the selected beam formation code and transmitting the transmission data to a specific mobile terminal.

According to another embodiment of the invention, there is provided a beam forming method. The method includes: estimating a channel through which pilots are received from a base station using the received pilots, the number of pilots generated by the base station being equal to the number of transmitting antennas; estimating a plurality of channel gains of codewords in a quantization codebook using the estimated channel and a random unitary matrix having a predetermined pattern; and feeding back an index of a codeword having the largest gain of the estimated channel gains and channel quality information corresponding to the codeword.

According to still another embodiment of the invention, a beam forming apparatus includes: a scheduler that receives a plurality of codeword indexes and channel quality information corresponding to the codeword indexes from a plurality of mobile terminals and selects a specific mobile terminal that will receive data on the basis of the codeword indexes and the channel quality information; a quantization preprocessor that outputs a beam formation code used to perform beam forming on a channel suitable for data transmitted to the specific mobile terminal selected by the scheduler among a plurality of channels; a codeword channel gain estimating unit that multiplies the data to be transmitted to the specific mobile terminal by a random unitary matrix having a predetermined pattern and estimates channel gains of codewords in a quantization codebook on the basis of the multiplied result; and a data generator that generates a data signal to be transmitted to the selected specific mobile terminal on the basis of the beam formation code for beam forming that is output from the quantization preprocessor and the channel gains estimated by the codeword channel gain estimating unit.

According to yet another embodiment of the invention, a beam forming apparatus includes: a channel estimating unit that estimates a channel using pilots for channel estimation that are received from a base station; a codebook storage unit that stores a quantization codebook used to perform vector quantization on data received from the base station such that the quantization codebook is associated with the base station; a channel gain estimating unit that estimates channel gains of a plurality of codewords of the quantization codebook, on the basis of the channel estimated by the channel estimating unit and the quantization codebook stored in the codebook storage unit, and selects an index of a codeword having the largest gain of the channel gains; and a codeword channel quality information generator that generates channel quality information corresponding to the index of the codeword selected by the channel gain estimating unit, and feeds back the channel quality information and the index of the codeword having the largest gain to the base station.

Advantageous Effects

According to the above-described exemplary embodiments, the mobile terminal stores a codebook that has been known to the base station, and the mobile terminal can select an index using the codebook. Therefore, it is possible to selectively give diversity, resulting in an improvement in system efficiency.

Further, pilots are used to estimate a channel, and the number of codewords to be used increases to increase the system capacity.

BRIEF DESCRIPTION OF THE DRAWINGS

FIG. 1 is a diagram illustrating the structure of a general pilot transmitting unit.

FIG. 2 is a diagram illustrating the structure of a base station according to an exemplary embodiment of the present invention.

FIG. 3 is a diagram illustrating a time slot according to an exemplary embodiment of the present invention.

FIG. 4 is a diagram illustrating the structure of a mobile terminal according to an exemplary embodiment of the present invention.

FIG. 5 is a flowchart illustrating a beam forming method according to an exemplary embodiment of the present invention.

FIG. 6 is a graph illustrating the relationship between system capacity and the number of users according to a first exemplary embodiment of the present invention.

FIG. 7 is a graph illustrating the relationship between the system capacity and the number of users according to a second exemplary embodiment of the present invention.

FIG. 8 is a graph illustrating the relationship between the system capacity and the number of unitary matrixes according to an exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a diagram illustrating the structure of a general pilot signal transmitting unit.

As shown in FIG. 1, considering that OBF performance is not good when the number of users is small, a pilot signal transmitting unit is configured so as to transmit multiple pilots during each time slot in order to improve diversity performance. First, it is assumed that the number of users is K, and the number of multiple pilots is Q.

In this case, when each mobile terminal measures a channel gain obtained by Q pilot signals, a channel gain of a q-th pilot signal of a k-th user may be represented by $|W_q(t)h_k(t)|^2$. Here, t indicates an index of the time slot, and each antenna is multiplied by a vector $W_q(t)$ in the q-th pilot signal. In addition, the term "time slot" is defined by the unit of scheduling, that is, the unit of time when a signal is fed back, and $h_k(t)$ means a radio channel coefficient of the k-th user, assuming that a channel is not changed during the time slot.

The mobile terminal feeds back the measured channel gain, or channel capacity, which is a channel gain function, to a base station. The base station selects an optimum beam index on the basis of received information using the following Equation 1:

$$q^*(t) = \arg\max_{q=1,\ldots,Q}\left\{\max_{k=1,\ldots,K}|w_q(t)^T h_k(t)|^2\right\} \quad \text{(Equation 1)}$$

The base station finds a user $$k^*(t)$$

having the maximum channel gain for the beam $$w_{q^*}(t)$$

selected by Equation 1, multiplies a corresponding pilot signal by data $$d_{k^*}(t)$$

that the user wants to use to generate an optimum beam index $$w_{q^*}(t)d_{k^*}(t),$$

and transmits the optimum beam index during a corresponding time slot. For convenience of explanation, a time index t of a sub-script is omitted.

In this way, the OBF technique using multiple pilot signals shown in FIG. 1 uses multiple pilots to selects pilot signals using various methods, thereby obtaining a gain. However, in the OBF technique, the system capacity may be reduced due to the number of multiple pilot signals. Therefore, a pilot signal selecting method that does not affect an increase or decrease in the system capacity and does not limit the number of pilot signals is needed. Next, the structure of a base station that transmits only the pilot signal for estimating a channel according to an exemplary embodiment of the present invention will be described with reference to FIG. 2.

FIG. 2 is a diagram illustrating the structure of a base station according to an exemplary embodiment of the present invention.

As shown in FIG. 2, a base station 100 includes a data selecting unit 110, a codeword channel gain estimating unit 120, a data generator 130, a pilot generator 140, a quantization preprocessor 150, and scheduler 160. The base station 100 communicates with a plurality of mobile terminals 300 through a channel 200, and is fed back with a selected codeword index and channel gain information, which is a channel quality indicator (CQI) corresponding to the codeword index, from the mobile terminal 300.

The scheduler 160 determines to which user to transmit data, when receiving the codeword indexes selected by the mobile terminals 300 and a plurality of information items on the channel gains corresponding to the codeword indexes from the mobile terminals 300. That is, the scheduler 160 selects a mobile terminal on the basis of the codeword indexes fed back from the mobile terminals 300 and the information items on the channel gains corresponding to the codeword indexes, and transmits information on the selected mobile terminal to the data selecting unit 110. Since it is difficult to transmit data for a plurality of users during a predetermined time slot, the scheduler 160 transmits information including a method of adaptively modulating data transmitted to the selected mobile terminal and a coding method thereof to the data selecting unit 110 and the quantization preprocessor 150, considering the characteristics of an antenna suitable for the data transmitted to the selected mobile terminal.

The quantization preprocessor 150 performs a beam forming process such that each of the mobile terminals 300 can receive a plurality of signals, in order to provide data signals to the mobile terminals 300. That is, the quantization preprocessor 150 creates code information for performing the beam forming process, on the basis of the information including the method of adaptively modulating data and the coding method and the characteristics of an antenna suitable for data that are received from the scheduler 160, and transmits the code information to the data generator 130.

The quantization preprocess can be used when the mobile terminal 300 has known a plurality of channel sets and a codebook suitable for each channel set is given (the codebook includes codeword indexes for the quantization preprocess). That is, the mobile terminal 300 determines a channel set that is most similar to a channel through which the pilot for estimating the current channel is received, and feeds back the index to the base station. Then, the base station 100 selects a codebook suitable for the determined channel set and transmits data for the selected codebook to the mobile terminal 300. Since the quantization preprocess has already been known, detailed description thereof will be omitted in this embodiment of the present invention.

The data selecting unit 110 selects data that the mobile terminal selected by the scheduler 160 wants to use. That is, the data selecting unit collects data to be transmitted to the mobile terminal selected by the scheduler 160, and transmits the collected data to the codeword channel gain estimating unit 120. In this case, a plurality of servers may collect the data using various methods. The data collecting methods have been known, and thus a detailed description thereof will be omitted in this embodiment of the present invention.

The codeword channel gain estimating unit 120 multiplies data to be used by the user selected by the data selecting unit 110 by one of the unitary matrixes included in both the mobile terminals 300 and the base station 100, and outputs calculated data. The unitary matrix is one of a plurality of matrixes that are stored in the mobile terminals 300 and the base station 100. In addition, the unitary matrix is used when the mobile terminals 300 having received the pilot for estimating a channel predict a codeword index on the basis of the estimated channel.

The data generator 130 generates data signals to be actually transmitted to the mobile terminal, on the basis of data output from the codeword channel gain estimating unit 120 and a code for forming a beam that is transmitted from the quantization pre-processor 150. In this case, the data signals are generated by multiplying data that the user wants to use, a code for forming a beam, a codeword that is simultaneously selected with the selection of the user, and a unitary matrix corresponding to time.

The pilot generator 140 generates pilots that will be transmitted to a plurality of mobile terminals 300 to perform a channel estimating process of estimating fading information of a subcarrier. The plurality of mobile terminals 300 use the pilots received through the channel 200 to generate information on channel capacity and a channel gain for the pilot that is capable of obtaining a maximum channel gain, and feeds back the information to the base station 100. In this case, the number of pilots generated is equal to the maximum number of transmitting antennas.

When the base station 100 having the above-mentioned components according to the embodiment of the invention transmits the pilots generated by the pilot generator 140 to the mobile terminals 300 through the channel 200 in order to perform channel estimation, the mobile terminal 300 estimates a channel gain of each codeword in the quantization codebook, using a random unitary matrix U(t) having a predetermined pattern and the channel estimated by the mobile terminal 300. The mobile terminal 300 feeds back CQI including data capacity or a maximum channel gain and an index $$q_k^*$$

of a codeword having a maximum gain among the estimated channel gains to the base station 100.

The scheduler 160 of the base station 100 selects an appropriate user $$k^*(t)$$

on the basis of the feedback information. In this case, a proportional fair scheduler or the scheduler 160 capable of obtaining different types of multi-user diversity may be used. The scheduler 160 according to the embodiment of the present invention should have a characteristic such that a cost function is proportional to a channel gain. However, since a general scheduler satisfies the characteristic, the type of scheduler is not particularly limited to the scheduler 160.

Finally, the base station 100 transmits the product $$U(t)c_{q^*_{k^*}}d_{k^*}(t)$$

of a unitary matrix corresponding to a selected codeword and time and data $$d_{k^*}(t)$$

that the user $$k^*(t)$$

wants to use to the mobile terminal during a corresponding time slot.

The time slot in which the pilot is transmitted to the mobile terminal 300 will be described in detail with reference to FIG. 3.

FIG. 3 is a diagram illustrating an example of the time slot according to an exemplary embodiment of the present invention.

Referring to FIG. 3, the pilots that are generated by the pilot generator 140 in order to perform channel estimation are transmitted to the mobile terminal 300. In this case, pilots that are equal to the maximum number of transmitting antennas are required. That is, even when the coherence time of a channel is composed of several or several tens of time slots, channel estimation is not necessarily performed for each time slot.

The term "time slot" is defined by the unit of scheduling, that is, the unit of time when a signal is fed back.

Among a plurality of mobile terminals having received the pilots for channel estimation, a k-th mobile terminal has a channel $$h_k$$

that is estimated by the pilot, and estimates the channel gains of every Q codewords of the quantization codebook, that is, $$|h_k^T U(t) c_q|^2$$

where q=1, Q, on the basis of a random unit matrix U(t) having a predetermined pattern. An index $$q_k^*$$

of a codeword having the maximum gain among the estimated channel gains and CQI corresponding to the codeword are fed back to the base station. A common index of the codeword has already been stored in all of the mobile terminals 300.

This will be represented by the following Equation 2. Transmitter and receiver sides, that is, the base station 100 and the mobile terminals 300, should know the random unitary matrix, and the unitary matrix is changed in a predetermined pattern.

$$q_k^* = \arg\max_{q=1,\ldots,Q} |h_k^T U(t) c_q|^2 \quad \text{(Equation 2)}$$

A proportional fair scheduler or a scheduler capable of obtaining different types of multi-user diversity is used as the scheduler 160 of the base station, and the scheduler 160 selects an appropriate user k*(t)

on the basis of the above-mentioned information.
Finally, the base station transmits the product $U(t) c_{q^*_k} d_{k^*}(t)$ of data $d_{k^*}(t)$ that the user k*(t)

wants to use and a unitary matrix corresponding to a selected codeword and time to the mobile terminal 300 through the time spot. A data transmission model is represented by the following Equation 3:

$$y_k(t) = h_k^T U(t) c_{i^*_k} d_{k^*}(t) + n_k(t) \quad \text{(Equation 3)}$$

In Equation 3, $Y_k(t)$ is a signal transmitted to a k-th user from the base station 100 during a data transmission period, and $n_k(t)$ indicates white noise and an interference signal.

Similarly, when a channel does not vary in the next period t+1, the same process as described above may be repeated on the basis of the channel estimated in the previous period and a unitary matrix U(t+1) that will be used in the next period.

Next, the structure of the mobile terminal 300, which is a receiver for receiving data from the above-mentioned system, will be described with reference to FIG. 4.

FIG. 4 is a diagram illustrating the structure of the mobile terminal according to the embodiment of the present invention.

As shown in FIG. 4, the mobile terminal 300 includes a channel estimating unit 310, a channel gain estimating unit 320, a codebook storage unit 340, and a codeword channel quality information generator 330.

The channel estimating unit 310 receives the pilots from the base station 100 and estimates a channel. The channel estimating method has already been known, and thus a detailed description thereof will be omitted in the embodiment of the present invention.

The channel gain estimating unit 320 estimates channel gains of a plurality of codewords included in the quantization codebook, on the basis of the channel estimated by the channel estimating unit 310 and the quantization codebook stored in the codebook storage unit 340, which will be described later, and selects the index of a codeword having the maximum gain among the channel gains.

The codebook storage unit 340 stores a codebook required to perform vector quantization on data received from the base station 100. Both the base station 100 and the mobile terminal 300 know the quantization codebook, and the quantization codebook is stored in the codebook storage unit 340 so as to be associated with the base station 100.

The codeword channel quality information generator 330 generates channel quality information corresponding to the index of the codeword selected by the channel gain estimating unit 320, and feeds back the index of the selected codeword and channel quality information corresponding thereto to the base station 100. The feedback information is used as basic information for the base station 100 to select the user and perform a beam forming process.

In this case, the feedback information does not include channel gains corresponding to all of the pilots, unlike the general OBF system. This is because, when a proportional fair scheduler used by the OBF system or a scheduler capable of obtaining different types of multi-user gains is used, a cost function is proportional to a channel gain.

That is, the cost function is not connected with the codeword, and the cost function can be defined by $f_k(G_{q,k}(k))$.

In the cost function, $G_{q,k}(k)$ indicates a channel gain of a q-th codeword and a k-th user. In a system according to an exemplary embodiment of the present invention, it is defined that $G_{g,k}(k)$ is equal to $|h_k^T U(t) c_q|^2$.

In this case, the following is established:

$$\max_q \max_k f_k(G_{q,k}(t)) = \max_k f_k\left(\max_q G_{q,k}(t)\right).$$

Therefore, first, only the codewords that allow each user to obtain the maximum gain are selected, and then the base station 100 compares the values of the selected codewords to select a user. Thus, the mobile terminal feeds back only the index of the codeword having the maximum gain and the channel quality information corresponding thereto to the base station, without transmitting the channel gains corresponding to all of the pilots.

Next, a process of forming a beam and a process of transmitting data using the above-mentioned system, the time slot, and the mobile terminal 300 will be described in detail with reference to FIG. 5.

FIG. 5 is a flowchart illustrating the beam forming process according to an exemplary embodiment of the present invention.

As shown in FIG. 5, first, the pilot generator 140 of the base station 100 generates pilots for channel estimation (S100), and transmits the generated pilots to a plurality of mobile terminals 300. In this case, pilots of a number that is equal to the maximum number of transmitting antennas are generated, and then transmitted to the mobile terminals 300.

The mobile terminal 300 having received the pilot estimates a channel using the received pilot (S120), and then estimates channel gains of Q codewords of the quantization codebook, using a random unit matrix U(t) having a predetermined pattern and the estimated channel gain (S130). The mobile terminal 300 generates an index of a codeword having the maximum gain among the estimated channel gains and channel quality information corresponding thereto (S140), and feeds them back to the base station 100 (S150). The feedback information is transmitted to the scheduler 160, and the scheduler 160 selects an appropriate user, that is, the optimum mobile terminal 300, on the basis of the received information.

Then, the data selecting unit 110 selects data that will be transmitted to the selected mobile terminal 300, that is, data that the user wants to use, and collects the data (S170). At the same time, the quantization preprocessor 150 forms an appropriate beam on the collected data (S180). The data generator 130 generates data to be actually transmitted, on the basis of the beam formed by the quantization preprocessor 150 and channel information that is estimated by the codeword channel gain estimating unit 120 on the basis of the data collected by the data selecting unit 110 (S190). That is, the data generator 130 multiplies a unitary matrix corresponding to the codeword and time that are selected by the scheduler 160 at the same time the user is selected by data that the user wants to use to generate transmission data.

Assuming that the time when the mobile terminal 300 uses the pilot generated by the pilot generator 140 to generate a codeword index and channel quality information is t−1, the time when the base station 100 receives the information from the mobile terminal 300 and selects the user is "t". The generated data is transmitted to the mobile terminal 300 during a corresponding time slot (S200).

Next, a method of measuring the actual system capacity using the above-mentioned system and the time slot according to an exemplary embodiment of the invention will be described with reference to FIGS. 6 to 8. In the embodiment, it is assumed that the transmitting antennas of the base station are statistically uncorrelated with each other, the speed of the mobile terminal 300 is 1 km/h in a channel, and the average channel gains of the users are equal to each other.

In addition, it is assumed that one pilot accounts for 1% of one time slot, and the number of necessary pilots is equal to the maximum number of transmitting antennas for every time pilot. The code book used in the quantization preprocessor 150 and the unit matrix are arbitrarily generated. In addition, it is assumed that the number of transmitting antennas is 4.

FIG. 6 is a graph illustrating the relationship between system capacity and the number of users according to a first exemplary embodiment of the present invention.

FIG. 6 shows the relationship between the system capacity and the number of users when Q=8, that is, when a 3-bit codebook is used. In this embodiment, 80 matrixes that are set between the base station and the mobile terminal are randomly used as a unitary matrix.

A basic system in which each mobile terminal 300 transmits a channel gain and the base station 100 allocates resources using a proportional fair algorithm has the lowest performance. In the graph shown in FIG. 6, a line that links circles represents the performance of an OBF system, and a line that links diamonds represents the performance of an OBF system using multiple pilots.

In addition, a line that links Xs represents the performance of a system that uses only the quantization preprocessor without using a random unitary matrix in order for comparison with the exemplary embodiment of the invention. It will be understood that the system selectively performs an OBF process on various fixed beams.

The system according to the exemplary embodiment of the present invention has a higher degree of system efficiency than the system using only the quantization pre-processor, which means that the random unitary matrix causes a large and rapid variation in a channel, resulting in a large increase in multi-user diversity gain. In addition, the system according to the exemplary embodiment of the present invention has a higher performance than the OBF system using multiple pilots. This is because the OBF system using multiple pilots uses 8 pilots for each time slot, but the system according to the exemplary embodiment of the invention uses 4 pilots, which is equal to the number of transmitting antennas, for each time slot. Further, the system according to the embodiment of the invention has a higher degree of system efficiency than the OBF system, as the number of users becomes small.

Next, the relationship between the system capacity and the number of users when only the size of a codebook increases to 4 bits in the same environment as that shown in FIG. 6 will be described with reference to FIG. 7.

FIG. 7 is a graph illustrating the relationship between the system capacity and the number of users according to a second exemplary embodiment of the present invention.

As shown in FIG. 7, when a necessary information bit is increased by 1 due to the feedback, the system capacity according to the number of users increases in this exemplary embodiment of the present invention. On the other hand, the performance of the OBF system using multiple pilots is considerably lowered due to an increase in the number of pilots. When the number of users is about 7 or more, an OBF system using a single pilot has higher performance than the OBF system using multiple pilots.

Next, system capacity according to still another embodiment of the present invention will be described with reference to FIG. 8.

FIG. 8 is a graph illustrating the relationship between the system capacity and the number of unitary matrixes according to an exemplary embodiment of the present invention.

A 3-bit codebook is used to measure the system capacity shown in FIG. 8, similar to FIG. 6, and the number of users is set to 10. In FIG. 8, a structure using one unit matrix is identical to the structure using only the quantization preprocessor as in FIG. 5. In this case, the performance of the system using the one unitary matrix is the same as that of the system using only the quantization preprocessor.

However, the system according to the exemplary embodiment of the present invention has higher performance as the number of unitary matrixes increases. When about 10 or more unitary matrixes are used, the performance of the system converges. This means that, when the number of unitary matrixes is larger than a predetermined value, sufficient randomness is obtained. That is, this means that it is possible to maintain sufficient system performance even when a large number of necessary unitary matrixes are not provided in the base station 100 and the mobile terminal 300 in the exemplary embodiment of the present invention.

A program for allowing a computer to execute the components according to the embodiment of the invention and a recording medium having the program recorded thereon are also included in the scope of the invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of forming a beam on a mobile terminal in a base station, comprising:
receiving channel quality information and a codeword index for quantization from a plurality of mobile terminals that have received pilot signals for channel estimation, and selecting one mobile terminal on the basis of the channel quality information and the codeword index;

collecting data to be transmitted to the selected mobile terminal, and selecting a beam formation code for the collected data; and generating transmission data on the basis of the collected data and the selected beam formation code and transmitting the transmission data to a specific mobile terminal, wherein the transmission data is generated in the following form:

$$y_k(t) = h_k^T U(t) c_{i^*_k} d_{k^*}(t) + n_k(t),$$

where $y_k(t)$ indicates a data signal received by a k-th specific mobile terminal in a data transmission period, and $n_k(t)$ indicates white noise and an interference signal.

2. The beam forming method of claim 1, wherein the transmitting of the transmission data to the mobile terminal includes:

estimating a channel gain of a quantization codebook using a random unitary matrix for the collected data; and multiplying the collected data by a codeword having the largest gain and a unitary matrix corresponding to a data collecting time to generate beam index information, and transmitting the beam index information to the mobile terminal by using the formed beam.

3. The beam forming method of claim 1, wherein the mobile terminal that receives the pilot signals and provides information to the base station in order to form the beam performs:

estimating a channel through which the pilots are received from the base station using the received pilots, the number of pilots generated by the base station being equal to the number of transmitting antennas;

estimating a plurality of channel gains of codewords in the quantization codebook using the estimated channel and a random unitary matrix having a predetermined pattern; and feeding back an index of a codeword having the largest gain of the estimated channel gains and the channel quality information corresponding to the codeword to the mobile terminal.

4. The beam forming method of claim 3, wherein the codeword index is calculated as follows:

$$q_k^* = \arg\max_{q=1,\ldots,Q} |h_k^T U(t) c_q|^2$$

(where $q_k^*$ means the channel gains of every Q codewords of the quantization codebook).

5. The beam forming method of claim 3, wherein the quantization codebook is the same as that used in the base station.

6. A beam forming apparatus comprising:

a scheduler that receives a plurality of codeword indexes and channel quality information corresponding to the codeword indexes from a plurality of mobile terminals and selects a specific mobile terminal that will receive data on the basis of the codeword indexes and the channel quality information;

a quantization preprocessor that outputs a beam formation code used to perform beam forming on a channel that is suitable for data transmitted to the specific mobile terminal selected by the scheduler among a plurality of channels;

a codeword channel gain estimating unit that multiplies the data to be transmitted to the specific mobile terminal by a random unitary matrix having a predetermined pattern and estimates channel gains of codewords in a quantization codebook on the basis of the multiplied result; and a data generator that generates a data signal to be transmitted to the selected specific mobile terminal on the basis of the beam formation code for beam forming that is output from the quantization preprocessor and the channel gains estimated by the codeword channel gain estimating unit, wherein the data signal is generated in the following form:

$$y_k(t) = h_k^T U(t) c_{i^*_k} d_{k^*}(t) + n_k(t),$$

where $Y_k(t)$ indicates a data signal received by a k-th specific mobile terminal in a data transmission period, and $n_k(t)$ indicates white noise and an interference signal.

7. The beam forming apparatus of claim 6, further comprising:

a pilot generator that generates pilots for estimating the channels of the plurality of mobile terminals; and a data selecting unit that collects data to be transmitted to the specific mobile terminal selected by the scheduler and transmits the collected data to the codeword channel gain estimating unit.

8. The beam forming apparatus of claim 6, wherein the channel gains of the plurality of codewords and channel quality information corresponding to the codewords are collected by estimating the channel gain of the quantization codebook using the channels estimated by the plurality of mobile terminals and the random unitary matrix.

9. The beam forming apparatus of claim 8, wherein the channel quality information is information on data capacity or the channel gains of the codeword indexes.

10. The beam forming apparatus of claim 6, wherein the scheduler is a proportional fair scheduler having a characteristic such that a cost function is proportional to a channel gain or a scheduler capable of obtaining multi-user diversity.

11. The beam forming apparatus of claim 10, wherein the cost function is represented as follows:

$$f_k(G_{q,k}(t))$$

(where $G_{q,k}(t)$ indicates a channel gain of a q-th codeword and a k-th user, and $G_{q,k}(t)$ indicates $|h_k^T U(t) c_q|^2$).

12. A mobile terminal comprising:

a channel estimating unit that estimates a channel using pilots for channel estimation that are received from a base station;

a codebook storage unit that stores a quantization codebook used to perform vector quantization on data received from the base station such that the quantization codebook is associated with the base station;

a channel gain estimating unit that estimates channel gains of a plurality of codewords of the quantization codebook, on the basis of the channel estimated by the channel estimating unit and the quantization codebook stored in the codebook storage unit, and selects an index of a codeword having the largest gain of the channel gains; and a codeword channel quality information generator that generates channel quality information corresponding to the index of the codeword selected by the channel gain estimating unit, and feeds back the channel quality information and the index of the codeword having the largest gain to the base station, wherein the codeword index is calculated as follows:

$$q_k^* = \arg\max_{q=1,\ldots,Q} |h_k^T U(t) c_q|^2$$

where $q_k^*$ means the channel gains of every Q codewords of the quantization codebook.

13. The mobile terminal of claim 12, wherein a random unitary matrix that is stored in the mobile terminal and the base station in a predetermined form is used to select the index of the codeword having the largest gain.

14. A method of forming a beam on a mobile terminal in a base station, comprising:

receiving channel quality information and a codeword index for quantization from a plurality of mobile terminals that have received pilot signals for channel estimation, and selecting one mobile terminal on the basis of the channel quality information and the codeword index;

collecting data to be transmitted to the selected mobile terminal, and selecting a beam formation code for the collected data; and generating transmission data on the basis of the collected data and the selected beam formation code and transmitting the transmission data to a specific mobile terminal, wherein the codeword index is calculated as follows:

$$q_k^* = \arg\max_{q=1,\ldots,Q} |h_k^T U(t) c_q|^2$$

where $q_k^*$ means the channel gains of every Q codewords of the quantization codebook.

15. The beam forming method of claim 14, wherein the mobile terminal that receives the pilot signals and provides information to the base station in order to form the beam performs:

estimating a channel through which the pilots are received from the base station using the received pilots, the number of pilots generated by the base station being equal to the number of transmitting antennas;

estimating a plurality of channel gains of codewords in the quantization codebook using the estimated channel and a random unitary matrix having a predetermined pattern; and feeding back an index of a codeword having the largest gain of the estimated channel gains and the channel quality information corresponding to the codeword to the mobile terminal.

16. A beam forming apparatus comprising:

a scheduler that receives a plurality of codeword indexes and channel quality information corresponding to the codeword indexes from a plurality of mobile terminals and selects a specific mobile terminal that will receive data on the basis of the codeword indexes and the channel quality information;

a quantization preprocessor that outputs a beam formation code used to perform beam forming on a channel that is suitable for data transmitted to the specific mobile terminal selected by the scheduler among a plurality of channels;

a codeword channel gain estimating unit that multiplies the data to be transmitted to the specific mobile terminal by a random unitary matrix having a predetermined pattern and estimates channel gains of codewords in a quantization codebook on the basis of the multiplied result; and a data generator that generates a data signal to be transmitted to the selected specific mobile terminal on the basis of the beam formation code for beam forming that is output from the quantization preprocessor and the channel gains estimated by the codeword channel gain estimating unit, wherein the scheduler is a proportional fair scheduler having a characteristic such that a cost function is proportional to a channel gain or a scheduler capable of obtaining multi-user diversity, and wherein the cost function is represented as follows:

$$f_k(G_{q,k}(t))$$

where $G_{q,k}(t)$ indicates a channel gain of a q-th codeword and a k-th user, and $G_{q,k}(t)$ indicates $|h_k^T U(t) c_q|^2$.

* * * * *